US008566011B2

(12) United States Patent
Tas et al.

(10) Patent No.: US 8,566,011 B2
(45) Date of Patent: Oct. 22, 2013

(54) DATA COLLECTION AND TRAFFIC CONTROL USING MULTIPLE WIRELESS RECEIVERS

(75) Inventors: Nazif Cihan Tas, Lawrenceville, NJ (US); Tamer M. Nadeem, Virginia Beach, VA (US)

(73) Assignee: Siemens Corporation, Iselin, NJ (US)

( * ) Notice: Subject to any disclaimer, the term of this patent is extended or adjusted under 35 U.S.C. 154(b) by 55 days.

(21) Appl. No.: 13/232,231

(22) Filed: Sep. 14, 2011

(65) Prior Publication Data

US 2012/0083996 A1 Apr. 5, 2012

Related U.S. Application Data

(60) Provisional application No. 61/388,012, filed on Sep. 30, 2010.

(51) Int. Cl.

| | |
|---|---|
| ***G06F 19/00*** | (2011.01) |
| ***G06G 7/70*** | (2006.01) |
| ***G06G 7/76*** | (2006.01) |
| ***G08G 1/00*** | (2006.01) |

(52) U.S. Cl.

USPC .......... 701/119; 701/117

(58) Field of Classification Search

USPC .......... 701/117, 26, 410, 29.2, 38, 301; 340/905; 348/78; 398/48; 370/252

See application file for complete search history.

(56) References Cited

U.S. PATENT DOCUMENTS

| | | | | |
|---|---|---|---|---|
| 5,497,325 | A * | 3/1996 | Mine | 701/38 |
| 7,203,579 | B2 * | 4/2007 | Yokota et al. | 701/29.2 |
| 7,912,627 | B2 * | 3/2011 | Downs et al. | 701/117 |
| 8,160,805 | B2 * | 4/2012 | Downs et al. | 701/117 |
| 2007/0043500 | A1 * | 2/2007 | Chen | 701/117 |
| 2010/0010742 | A1 * | 1/2010 | Mochizuki | 701/301 |
| 2010/0302070 | A1 | 12/2010 | Puckett et al. | |
| 2012/0183292 | A1 * | 7/2012 | Boduch | 398/48 |
| 2012/0242819 | A1 * | 9/2012 | Schamp | 348/78 |
| 2012/0249343 | A1 * | 10/2012 | Thomas | 340/905 |
| 2012/0283941 | A1 * | 11/2012 | Kang et al. | 701/410 |
| 2012/0307676 | A1 * | 12/2012 | Chan et al. | 370/252 |
| 2012/0316725 | A1 * | 12/2012 | Trepagnier et al. | 701/26 |

OTHER PUBLICATIONS

Bakker et al. Traffic Light Control by Multiagent Reinforcement Learning Systems, Interactive Collaborative Information Systems (ICIS) project, pp. 1-37.

Puid Wg, , TX Power Service, Bluetooth Specification, pp. 1-10, Jun. 21, 2011; Texas.

* cited by examiner

*Primary Examiner* — Thomas Black
*Assistant Examiner* — Robert Payne

(57) ABSTRACT

Methods, systems, and devices for monitoring roadway traffic. A method includes transmitting wireless signals from a plurality of roadside equipment (RSE) devices, including from a first RSE device and from a second RSE device that are located at separated positions of an intersection. The method includes receiving responses by the first RSE device and second RSE device from a wireless device. The responses include a unique identifier corresponding to the wireless device. The method includes determining a signal strength of each of the responses by the first RSE and the second RSE and transmitting data from the first RSE device and the second RSE device to a control system. The data includes the unique identifier, the signal strength of each of the responses, and times that the responses were received. The method includes determining traffic information associated with the wireless device based on the received data.

20 Claims, 3 Drawing Sheets

DATA COLLECTION AND TRAFFIC CONTROL USING MULTIPLE WIRELESS RECEIVERS

CROSS-REFERENCE TO OTHER APPLICATION

This application claims the benefit of the filing date of U.S. Provisional Patent Applications 61/338,014, filed Sep. 30, 2010, and 61/388,012, filed Sep. 30, 2010, which are hereby incorporated by reference. This application has some subject matter in common with commonly-assigned, concurrently-filed U.S. patent application Ser. No. 13/232,248 for "Power Control in Wireless Traffic Detection Devices", hereby incorporated by reference.

TECHNICAL FIELD

The present disclosure is directed, in general, to improved traffic monitoring and control systems and methods.

BACKGROUND OF THE DISCLOSURE

For reasons related to safety, efficiency, environmental concerns, and other issues, improved traffic control and monitoring systems are desirable.

SUMMARY OF THE DISCLOSURE

Various disclosed embodiments include methods, systems, and devices for monitoring roadway traffic. A method includes transmitting wireless signals from a plurality of roadside equipment (RSE) devices, including from a first RSE device and from a second RSE device that are located at separated positions of an intersection. The method includes receiving responses by the first RSE device and second RSE device from a wireless device. The responses include a unique identifier corresponding to the wireless device. The method includes determining a signal strength of each of the responses by the first RSE and the second RSE and transmitting data from the first RSE device and the second RSE device to a control system. The data includes the unique identifier, the signal strength of each of the responses, and times that the responses were received. The method includes determining traffic information associated with the wireless device based on the received data.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Efficient traffic management can be accomplished using intelligent traffic control systems that are able to detect vehicles in the area of a traffic control device. Disclosed embodiments include systems and methods in which individual vehicles broadcast information to be received and processed by the traffic control system, which can use the information to determine such information as the speed and direction of travel of the vehicle.

As described herein and in the related patent application referenced above and incorporated herein, the systems and methods disclosed herein include various means of using onboard equipment (OBE) installed or used in a vehicle and roadside equipment (RSE) that detects the vehicle by communicating with the OBE. Of course, in various embodiments, some or all of the components of the RSE could be physically located other than "roadside", such as in a cabinet, traffic controller, signal head, or otherwise. The RSE can be used to control many different types of traffic equipments, and can be used to collect and send data to a central monitoring station for further analysis or action, using common networking and communication techniques.

For the OBE and RSE, radio technology can be used, and in particular, Bluetooth® wireless technology as described by the BLUETOOTH SPECIFICATION Version 4.0 (Jun. 30, 2010) by Bluetooth SIG, Inc., hereby incorporated by reference, can be used to implement techniques as described herein. Devices and processes that conform to this specification will be referred to herein as "Bluetooth®-compliant".

Disclosed embodiments include an RSE system and method that enables efficient identification of vehicles and their travel by detecting the same OBE, and therefore its vehicle, at multiple RSEs simultaneously.

Figure 1:
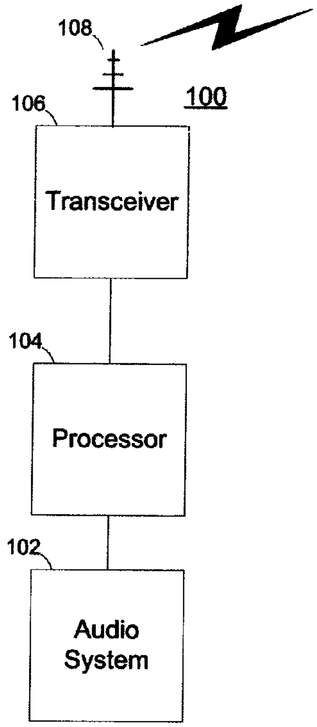
FIG. 1 depicts a simplified block diagram of an onboard equipment system in accordance with disclosed embodiments.

FIG. 1 depicts a simplified block diagram of an onboard equipment (OBE) system 100 in accordance with disclosed embodiments. In this diagram, processor 104 is connected between audio system 102 and transceiver 106, such that the processor 104 processes audio signals to and from audio system 102, and can transmit corresponding signals using transceiver 106 and antenna 108. In particular, processor 104, transceiver 106, and antenna 108 can be implemented using a Bluetooth®-compliant device, such as a user earpiece, mobile terminal such as a mobile phone or smartphone, and in particular can be implemented as part of an automobile's electronics, where the audio system 102 can be the automobile audio system. OBE system 100, in various embodiments, can perform one or more Bluetooth®-compliant processes or operations as described herein.

Those of skill in the art will recognize that not all other details are shown in this simplified diagram. For example, audio system 102 can be the audio system of an earpiece, mobile telephone, or computer system, or may also be connected to an automobile navigation system, an emergency-communication system, or to other components of an automobile. The audio system 102, processor 104, and transceiver 106 will each also be connected to a power source, such as a vehicle power source, and may each be connected to other systems and components of a vehicle. The processor 104, and other components, can be connected to read and write to a storage such as volatile and non-volatile memory, magnetic, optical, or solid-state media, or other storage devices. The antenna 108 may be dedicated to transceiver 106, or may be connected to be shared with other components. Processor 104 may be configured to perform only the processes described herein, or can also be configured to perform other processes for the operation and management of the vehicle. The various components of FIG. 1 could be constructed as separate elements connected to communicate with each other, or two or more of these components could be integrated into a single device. In some embodiments, the "audio system" 102 is not necessarily or exclusively an audio system, but can be another Bluetooth®-compliant device such as a computer, mobile telephone, or otherwise, and can perform other functions such as file transfers and otherwise.

Figure 2:
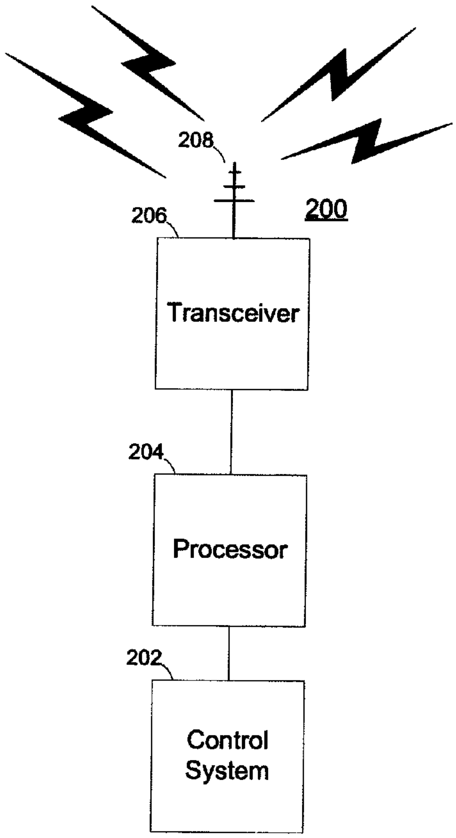
FIG. 2 depicts a simplified block diagram of a roadside equipment device in accordance with disclosed embodiments.

FIG. 2 depicts a simplified block diagram of a roadside equipment (RSE) device 200, in accordance with disclosed embodiments, that can be configured to perform processes as described herein. In this diagram, processor 204 is connected between a control system 202 and a transceiver 206. In particular, processor 204, transceiver 206, and antenna 208 can be implemented as a Bluetooth®-compliant device, and can perform one or more Bluetooth®-compliant processes or operations as described herein. The RSE device is an example of means for detecting wireless devices, such as Bluetooth®-compliant receivers or other OBE devices, traveling on a roadway. In some cases, an RSE can have multiple antennas that can be co-located, separated, oriented, or otherwise arranged to provide suitable transmission and reception for the location of the RSE The transceiver 206 sends data to and receives data from the OBE system 100 and then communicates it to processor 204. The processor 204 can then communicate with control system 202, which can use it for traffic control, monitoring, and management processes, as described in more detail herein. Control system 202 can be a signal controller, or a traffic signal with integrated controller, or other system configured to control traffic equipment, and in particular can be a centralized server system. In various embodiments, control system 202 can be connected to and can communicate with multiple RSE systems 200, each of which include a processor 204, transceiver 206, and antenna 208.

Those of skill in the art will recognize that not all other details are shown in this simplified diagram. For example, control system 202, processor 204, and transceiver 206 will each also be connected to a power source, and may each be connected to other systems and components of the RSE. The processor 204, and other components, can be connected to read and write to a storage such as volatile and non-volatile memory, magnetic, optical, or solid-state media, or other storage devices. The antenna 208 may be dedicated to transceiver 206, or may be connected to be shared with other components. Processor 204 may be configured to perform only the processes described herein, or can also be configured to perform other processes for the operation and management the RSE. The various components of FIG. 2 could be constructed as separate elements connected to communicate with each other, or two or more of these components could be integrated into a single device. In particular, processor 204 can be an integral part of the control system 202, and perform many or all of the other functions of the RSE.

Figure 3:
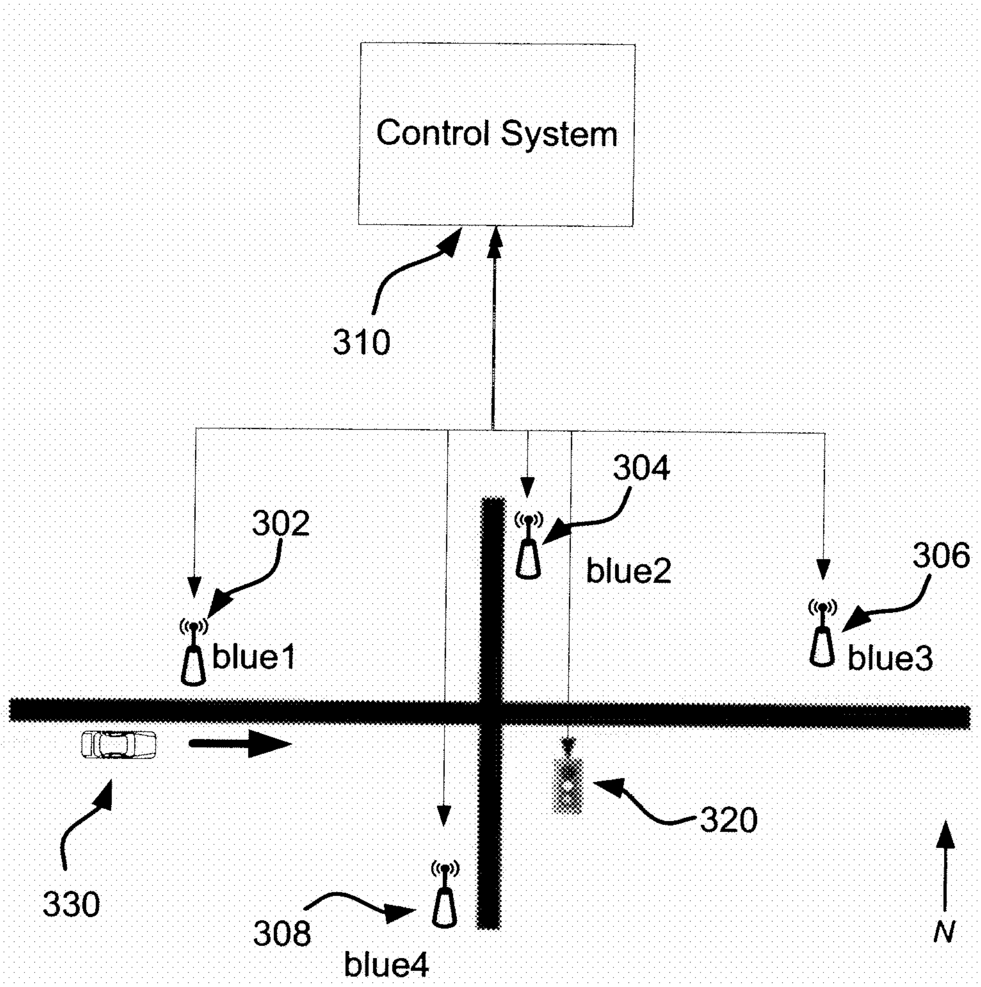
FIG. 3 depicts an example of an implementation on an intersection, in accordance with disclosed embodiments.

Disclosed embodiments have particular use in traffic control and monitoring systems. FIG. 3 depicts an example of an implementation on an intersection, in accordance with disclosed embodiments. Traffic Light Control (TLC) makes traffic data collection an important component of traffic management, and disclosed embodiments provide novel and effective means for accurate traffic data collection. One approach for data collection using Bluetooth® interfaces at traffic intersections in order to estimate the average travel time for the vehicles is disclosed in U.S. Patent Publication 2010/0302070A1 to Puckett, et al., hereby incorporated by reference.

In the example of FIG. 3, an intersection is shown with multiple roadside equipment devices such as RSE 200, shown as blue1 302, blue2 304, blue3 306, and blue4 308, each of which can be Bluetooth®-compliant devices. Blue1 302, blue2 304, blue3 306, and blue4 308 are each connected to communicate with control system 310. Control system 310 can also be connected to control traffic signal 320 at the intersection. In some embodiments, one or more of the RSEs at an intersection can be integrated with the traffic signals or other equipment at an intersection. For example, RSE blue1 302 can be integrated with traffic signal 320; in intersections with multiple traffic signals, an RSE could be integrated with each traffic signal in each direction.

In this example, blue1 302 is to the west (or on the west side) of the intersection, blue2 304 is to the north (or on the north side) of the intersection, blue3 306 is to the east (or on the east side) of the intersection, and blue4 308 is to the south (or on the south side) of the intersection.

In various embodiments, all RSE remain in scan/inquiry mode, continuously searching for OBEs. For example, each Bluetooth®-compliant RSE device 200 including blue1 302, blue2 304, blue3 306, and blue4 308 can perform a "paging" operation where it transmits a train of page messages until a response is received from the an OBE device or a timeout occurs. Each RSE 200 can act, in various embodiments, as a paging device. Alternately or additionally, each RSE 200 including blue 1 302, blue2 304, blue3 306, and blue4 308 can perform an "inquiry" procedure where it transmits inquiry messages and listens for responses in order to discover the other Bluetooth®-compliant devices that are within its respective coverage area; each RSE 200 can act, in various embodiments, as an inquiring device.

In the example of FIG. 3, there are four RSEs installed, including blue1 through blue4; however those of skill in the art will recognize that the number of RSEs/interfaces to be deployed and the places to deploy these RSEs/interfaces can vary from setting to setting.

The RSEs continuously collect information about the OBEs or other wireless devices close to them, together with the received signal strength of the wireless response messages; in Bluetooth®-compliant systems, this is the Received Signal Strength Indication (RSSI).

The RSEs can use, for example, a Bluetooth®-compliant Read RSSI command to read the value for the RSSI for a Connection_Handle to another controller. In a Bluetooth®-compliant embodiment, the Connection_Handle is used as the handle command parameter and return parameter. The RSSI parameter returns the difference between the measured Received Signal Strength Indication (RSSI) and the limits of a Golden Receive Power Range for a Connection Handle to another controller. The Connection_Handle must be a Connection_Handle for an ACL connection. Any positive RSSI value returned by the Controller indicates how many dB the RSSI is above the upper limit, any negative value indicates how many dB the RSSI is below the lower limit. The value zero indicates that the RSSI is inside the Golden Receive Power Range. The RSSI measurement compares the received signal power with two threshold levels, which define the Golden Receive Power Range. The lower threshold level corresponds to a received power between −56 dBm and 6 dB above the actual sensitivity of the receiver. The upper threshold level is 20 dB above the lower threshold level to an accuracy of +/−6 dB.

In some embodiments, the upper and lower threshold levels can be adjusted to a very narrow Golden Receive Power Range so that the majority of RSSI results will be positive and negative values.

The control system 310 can collect information at all times from the RSEs and has information about each OBE detected by each RSE, alone with each OBE device's ID and RSSI as a function of time. This information enables the control system to determine the direction of the vehicle and to project its route.

In an example implementation, as illustrated in FIG. 3, as car 330 proceeds along the road, blue1 302, blue2 304, blue3 306, and blue4 308 are performing a paging or inquiry operation, while the OBE in car 330 is performing a page scan or responding to inquiries. For simplicity of description, the operations of an OBE 100 in car 330 may be referenced below as the operations of car 330 itself.

Car 330 responds to the page messages or inquiry messages from blue1 302 by sending a response that includes its unique identifier (ID). The unique ID is registered by the Bluetooth interface blue1 and relayed to centralized control system 310. Control system 310 can be, for example, one or more server data processing systems having processors, memories, and storage, and is configured to perform actions as described herein. Control system 310 is an example of means for analyzing data produced by the RSE devices, and also can include means for controlling traffic signals or other equipment. The process above can be performed by each of the RSEs.

The on-board equipment such as OBE 100 in car 330 has a unique identifier; optionally, each RSE 200 including blue1 302-blue4 308, also has a unique identifier. In a Bluetooth® implementation, the unique identifier can be a Bluetooth Device Address (BD_ADDR), which is a 48-bit address used to identify each Bluetooth® device. The OBE is a connectable device in range that periodically listens on its page scan physical channel and will respond to a page on that channel or a device that is advertising using a connectable advertising event. Alternately or additionally, the OBE is a device that listens for and responds to inquiry messages received on its inquiry scan physical channel.

Each RSE 200 including blue1 302 and blue2 304 can perform a "paging" operation where it transmits a train of page messages until a response is received from the target OBE device or a timeout occurs. Each RSE 200 can act, in various embodiments, as a paging device. Alternately or additionally, each RSE 200 including blue1 302 and blue2 304 can perform an "inquiry" procedure where it transmits inquiry messages and listens for responses in order to discover the other Bluetooth devices that are within its respective coverage area; each RSE 200 can act, in various embodiments, as an inquiring device.

Assume in this example that car 330 approaches the intersection from the West, travelling East. As it first approaches, its OBE is first detected by RSE 302 blue1, with a relatively weak signal strength. As car 330 nears the intersection, the signal strength detected by RSE 302 blue1 increases, and it will eventually be detected by blue2 304 and blue4 308, and then blue3 306, with an initially-weak signal strength. As the car 330 approaches and passes each RSE, the signal strength for that OBE's unique ID will be transmitted to the control system 310, which will observe the signal strength increasing as the car 330 approaches each respective RSE, then decreasing again as the car 330 moves farther away again.

Control system 310 can then analyze the collected information from all the blue1 302, blue2 304, blue3 306, blue4 308, and other connected RSEs in order to compute traffic related statistics such as the average speed or direction of individual vehicles and traffic as a whole, since control system 310 can also know the locations of and distances between the RSEs. Control system 310 may also use this information to control traffic signal 320 or other traffic control devices.

The control system 310 can maintain, in memory or other storage, data related to the OBEs detected by the RSEs at any given time. The table below is a non-limiting example of such data. The "Device" column represents the unique ID for an OBE device, the "Time" column indicates the time at which that device ID was detected by each RSE, for example by receiving a response to a paging or inquiry message sent by the respective OBE, and the other columns indicate the received signal strength for the device ID for the respective RSE. Note that, for simplicity of this example, the received signal strengths are simply listed as low, medium, or high (or as a "–" for no detection).

| Device | Time | blue1 | blue2 | blue3 | blue4 |
|---|---|---|---|---|---|
| AA:BB:CC:DD:EE:FF | (12:42:25) | — | — | — | — |
| AA:BB:CC:DD:EE:FF | (12:42:45) | Low | — | — | — |
| AA:BB:CC:DD:EE:FF | (12:43:05) | Medium | Low | — | Low |
| AA:BB:CC:DD:EE:FF | (12:43:25) | High | Medium | Low | Medium |

-continued

| Device | Time | blue1 | blue2 | blue3 | blue4 |
|---|---|---|---|---|---|
| AA:BB:CC:DD:EE:FF | (12:43:45) | Medium | Medium | Medium | Medium |
| AA:BB:CC:DD:EE:FF | (12:44:05) | Low | Medium | High | Medium |
| AA:BB:CC:DD:EE:FF | (12:44:25) | — | Low | Medium | Low |
| AA:BB:CC:DD:EE:FF | (12:44:45) | — | — | Low | — |
| AA:BB:CC:DD:EE:FF | (12:45:05) | — | — | — | — |

Note that in this example, as car 330 approaches from the west and passes east through the intersection, the signal strength data collected by control system 310 shows that the signal strength at blue1 302, to the west of the intersection, increases from low to high as the car 330 approaches and decreases from high to low (and then not detected) as the car 330 moves away again. The signal strength at blue3 306, to the east of the intersection, mirrors the signal strength at blue 1, but is delayed by 40 seconds, showing that the car 330 approached and moved past blue3 306 about 40 seconds after it passed blue1 302.

The signal strength at blue2 304 and blue4 308 never increased above a "medium" level, and shows that car 330 did not travel to the north or south of the intersection, and the combined and substantially identical and synchronized strengths shows that car 330 passed through the intersection between them traveling in a latitudinal direction.

If, instead, car 330 had turned north at the intersection, for example, then the signal strength at blue2 304 would have continued to increase, but the signal strength at blue3 306 and blue4 308 would not have continued to increase. In this way, the system can determine the travel speed, direction, and projected route of the vehicle associated with the OBE, or can include information about traffic conditions by aggregating received data associated with multiple other OBEs, such as average traffic speed, traffic control efficiency, delays caused by traffic signals, and other information.

Figure 4:
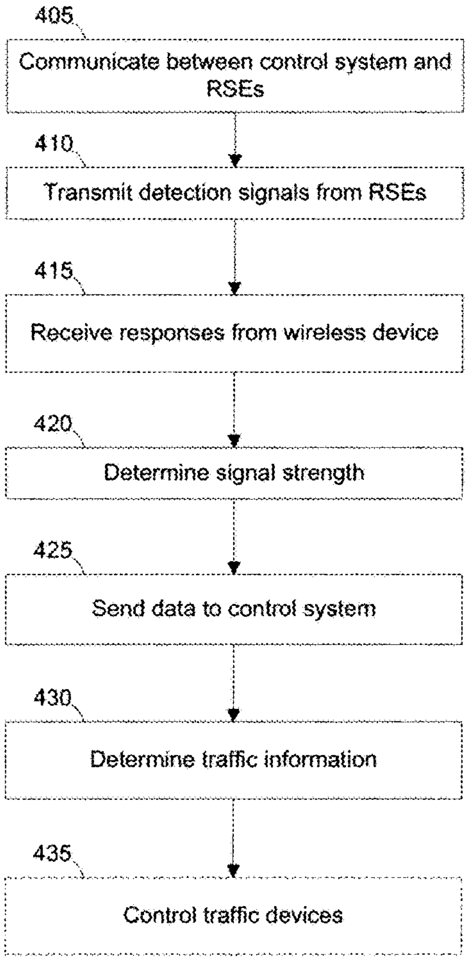
FIG. 4 depicts a process in accordance with disclosed embodiments.

FIG. 4 depicts a flowchart of a process in accordance with disclosed embodiments. The RSE steps described below can be performed by processor 204, in various embodiments. As used herein, the "system" will refer to the operations of control system 310 and one or more RSE devices 200 as a combined traffic monitoring system.

A control system communicates with a plurality of RSE devices located at separated positions of an intersection (step 405), including at least a first RSE device and a second RSE device. The RSE devices are located on different sides of an intersection, and each includes a transceiver that can determine received signal strengths. The RSE devices can each be located at an intersection or other location proximate to a roadway, and in other embodiments, can be located at positions on a roadway not proximate to an intersection.

The plurality of RSE devices transmit wireless signals to detect a wireless device (step 410). These signals can be, for example, Bluetooth®-compliant paging or inquiry messages, and the wireless device can be an OBE device, including a Bluetooth®-compliant device in a vehicle. The RSE devices and the wireless devices are configured for Bluetooth®-compliant communications which can include but is not limited to this specific messaging.

The first RSE and the second RSE receive responses from the wireless device (step 415). Each response includes a unique identifier corresponding to the wireless device. The responses can be received at the same (or approximately same) time, or at different times. In a typical implementation, one of the RSEs will receive a response before the other, indicating that the wireless device and the vehicle in which it is mounted or traveling is approaching from that direction.

The first RSE device and the second RSE device determine signal strengths of the respective received responses (step 420)

The first RSE and the second RSE transmit data to the control system (step 425). The data can include the unique identifier, the time(s) at which the first and second RSEs received the responses, and the signal strengths.

Based on the received data, the control system determines traffic information associated with the OBE (step 430). The traffic information can include information specific to that OBE, for example the travel speed, direction, and projected route of the vehicle associated with the OBE, or can include information about traffic conditions by aggregating received data associated with multiple other OBEs, such as average traffic speed, traffic control efficiency, delays caused by traffic signals, and other information. As described in detail above, the traffic information can be determined based on relative signal strengths of the responses received by the first and second RSEs at respective times. In this way, the control system can act as analyzing means for analyzing the received data.

The control system can control traffic control devices based on the traffic information (step 435). This can include operating traffic signals, information displays, streetlamps, and other traffic control and information devices as known to those of skill in the art. In this way, the control system, alone or in combination with one or more traffic control devices, can act as traffic control means.

The process above can be performed repeatedly and simultaneously for a plurality of wireless devices and a plurality of RSEs, to constantly receive and analyze data regarding the travel of vehicles past and between RSEs, and to perform other control or monitoring tasks using that data. In particular, steps 410-430 can be performed continuously to constantly accumulate responses from the wireless device, and send the data to the control system, while the wireless device is within range of the RSEs.

Disclosed embodiments provide distinct technical advantages in traffic control and monitoring, as described herein, and in particular since modern vehicles are typically equipped with wireless devices including Bluetooth®-compliant devices. In some embodiments, specific unique IDs can be associated with emergency vehicles, and the traffic control system can control traffic control devices, including traffic signals, to allow the emergency vehicle to travel efficiently.

Other traffic control systems are described in Bakker, B.; Whiteson, S.; Kester, L.; Groen, F. C. A. "Traffic light control by multiagent reinforcement learning systems", Interactive collaborative information systems, Vol. 281, p. 475-510, hereby incorporated by reference.

Those skilled in the art will recognize that, for simplicity and clarity, the full structure and operation of all systems suitable for use with the present disclosure is not being depicted or described herein. Instead, only so much of an OBE and an RSE system as is unique to the present disclosure or necessary for an understanding of the present disclosure is depicted and described. The remainder of the construction and operation of the systems disclosed herein may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form. None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method, comprising:

transmitting wireless signals from a plurality of roadside equipment (RSE) devices, including from a first RSE device and from a second RSE device that are located at separated positions of an intersection;

receiving responses by the first RSE device and second RSE device from a wireless device, the responses including a unique identifier corresponding to the wireless device;

determining a signal strength of each of the responses by the first RSE and the second RSE;

transmitting data from the first RSE device and the second RSE device to a control system, the data including the unique identifier, the signal strength of each of the responses, and times that the responses were received;

determining traffic information associated with the wireless device based on the received data.

2. The method of claim 1, wherein wireless signals and responses are compliant with BLUETOOTH SPECIFICATION Version 4.0 (Jun. 30, 2010) by Bluetooth SIG, Inc.

3. The method of claim 1, wherein the traffic information is determined based on relative signal strengths of the responses received by the first and second RSEs at respective times.

4. The method of claim 1, wherein the traffic information includes a direction of travel of the vehicle associated with the wireless device.

5. The method of claim 1, wherein the traffic information includes average traffic speeds based on data related to multiple wireless devices.

6. A method, comprising:

providing data communications between a control system and a plurality of roadside equipment (RSE) devices, including at least a first RSE device and from a second RSE device that are located at separated positions of an intersection and geographically separated from the control system;

receiving data from the first RSE device and the second RSE device by the control system, the data including a unique identifier for a wireless device in a vehicle, times that responses were received from the wireless device by the first RSE device and the second RSE device, and signal strengths of each of the responses; and determining traffic information associated with the wireless device based on the received data.

7. The method of claim 6, wherein the RSE devices and the wireless devices are configured for communications compliant with BLUETOOTH SPECIFICATION Version 4.0 (Jun. 30, 2010) by Bluetooth SIG, Inc.

8. The method of claim 6, wherein the traffic information is determined based on relative signal strengths of the responses received by the first and second RSEs at respective times.

9. The method of claim 8, wherein the traffic information includes a direction of travel of the vehicle with the wireless device.

10. The method of claim 6, wherein the traffic information includes average traffic speeds based on data related to multiple wireless devices.

11. A traffic monitoring system, comprising:

a control system; and a plurality of roadside equipment (RSE) devices located geographically separate from the control system and at separated locations at an intersection, comprising at least a processor and a wireless transceiver, the RSE devices configured to transmit wireless signals and receive corresponding responses from a wireless device, and to send data to the control system corresponding to the responses, signal strengths of each of the response, and times the responses were received, wherein the control system determines traffic information associated with the wireless device based on the received data.

12. The traffic monitoring system of claim 11, wherein wireless signals and responses are compliant with BLUETOOTH SPECIFICATION Version 4.0 (Jun. 30, 2010) by Bluetooth SIG, Inc.

13. The traffic monitoring system of claim 11, wherein the traffic information is determined based on relative signal strengths of the responses received by the first and second RSEs at respective times.

14. The traffic monitoring system of claim 11, wherein the traffic information includes a direction of travel of a vehicle associated with the wireless device.

15. The traffic monitoring system of claim 11, wherein the traffic information includes average traffic speeds based on data related to multiple wireless devices.

16. The traffic monitoring system of claim 11, wherein the control system controls a traffic control device based on the traffic information.

17. A traffic monitoring system, comprising:

detecting means for detecting wireless devices traveling on a roadway, the detecting means including a transceiver, the detecting means configured to determine signal strengths of responses received from the detected wireless devices;

analyzing means for analyzing data produced by the detecting means; and traffic control means for controlling a traffic control devices.

18. The traffic monitoring system of claim 17, wherein the detecting means includes multiple roadside equipment devices separately located at an intersection and each including a transceiver and configured to detect the wireless devices as they travel between the roadside equipment devices.

19. The traffic monitoring system of claim 17, wherein the data includes signal strength information from wireless signals received by the detecting means.

20. The traffic monitoring system of claim 11, wherein the RSE devices are each configured to determine the signal strengths of each of the received responses.

* * * * *